US010236785B2

(12) United States Patent
Oates

(10) Patent No.: US 10,236,785 B2
(45) Date of Patent: Mar. 19, 2019

(54) APPARATUS AND METHOD FOR CONTROL OF DIRECT CURRENT TRANSMISSION LINES

(71) Applicant: Alstom Technology Ltd., Baden (CH)

(72) Inventor: Colin Oates, Brocton (GB)

(73) Assignee: ALSTOM TECHNOLOGY LTD. (CH)

( * ) Notice: Subject to any disclaimer, the term of this patent is extended or adjusted under 35 U.S.C. 154(b) by 0 days.

(21) Appl. No.: 15/035,660

(22) PCT Filed: Nov. 7, 2014

(86) PCT No.: PCT/EP2014/074072
§ 371 (c)(1),
(2) Date: May 10, 2016

(87) PCT Pub. No.: WO2015/067771
PCT Pub. Date: May 14, 2015

(65) Prior Publication Data
US 2016/0285378 A1    Sep. 29, 2016

(30) Foreign Application Priority Data
Nov. 11, 2013  (EP) ..................................... 13192363

(51) Int. Cl.
*H02M 5/42* (2006.01)
*H02M 1/12* (2006.01)
(Continued)

(52) U.S. Cl.
CPC ................ *H02M 5/42* (2013.01); *H02J 3/36* (2013.01); *H02M 1/12* (2013.01); *H02J 1/02* (2013.01);
(Continued)

(58) Field of Classification Search
CPC .......... H02M 5/42; H02M 1/12; H02M 1/126; H02M 1/42; H02M 1/44; H02J 3/36;
(Continued)

(56) References Cited

U.S. PATENT DOCUMENTS 4,994,981 A * 2/1991 Walker ...................... H02J 3/32
307/125
5,296,764 A    3/1994 Gunnar et al.
(Continued)

FOREIGN PATENT DOCUMENTS

EP    2 688 191 A1    1/2014

OTHER PUBLICATIONS

International Search Report dated Mar. 25, 2015.
(Continued)

*Primary Examiner* — Gustavo Rosario Benitez
(74) *Attorney, Agent, or Firm* — Parks IP Law LLC

(57) ABSTRACT

This application relates to methods and apparatus for control apparatus of a voltage source converter for direct current transmission of electrical power over a transmission line. The control apparatus comprises regulation control for generating a regulation signal for the converter to regulate an electrical parameter of the voltage source converter, such as voltage or power, so as to regulate power transmission over the transmission line. The regulation signal is based on the difference between a measured value of said parameter and a reference value of said parameter, as may be supplied from a reference control block and may be derived from a demand signal indicating the voltage or power demand. The apparatus also includes damping control configured to generate a damping signal for modulating said regulation signal to reduce the effect of resonance within the bandwidth of control of the converter. The damping signal is generated as a function of a measured voltage or current of the transmis-
(Continued)

sion line and an impedance value for the transmission line. The damping signal may be high-pass filtered so as to have no substantial impact on steady state operation.

19 Claims, 3 Drawing Sheets

(51) Int. Cl.
  *H02J 3/36* (2006.01)
  *H02J 1/02* (2006.01)
(52) U.S. Cl.
  CPC ......... *H02J 2003/365* (2013.01); *Y02E 60/60* (2013.01)
(58) Field of Classification Search
  CPC .......... H02J 1/02; H02J 2003/365; H02J 5/00; H02J 3/18; H04B 3/52; H04B 3/54; H04B 3/50; Y02E 60/60
  See application file for complete search history.

(56) References Cited

U.S. PATENT DOCUMENTS

| | | | | |
|---|---|---|---|---|
| 5,701,239 A * | 12/1997 | Bjorklund | ................. | H02J 3/36 363/35 |
| 8,933,572 B1 * | 1/2015 | Abdur-Rahim | ........... | H02P 9/00 290/44 |
| 2003/0016001 A1 * | 1/2003 | Borup | ....................... | H02J 3/18 323/364 |
| 2003/0035308 A1 * | 2/2003 | Lynch | ....................... | H02J 3/18 363/34 |
| 2007/0070660 A1 * | 3/2007 | Tallam | .................... | H02P 21/16 363/44 |
| 2007/0121354 A1 * | 5/2007 | Jones | .................. | H02M 5/4585 363/47 |
| 2012/0063179 A1 * | 3/2012 | Gong | ....................... | H02M 1/12 363/40 |
| 2012/0119568 A1 * | 5/2012 | Orion | ..................... | H04B 3/548 307/3 |
| 2012/0200166 A1 * | 8/2012 | Berggren | .................. | H02J 3/24 307/102 |
| 2012/0205911 A1 * | 8/2012 | Deng | ....................... | H02M 5/45 290/44 |
| 2012/0310426 A1 * | 12/2012 | Tarnowski | ............ | F03D 7/0272 700/287 |
| 2013/0127426 A1 * | 5/2013 | Berggren | ................ | H02J 1/102 323/234 |

OTHER PUBLICATIONS

Liu, X., et al., "Active Stabilisation of an HVDC Distribution System with Multiple Constant Power Loads," IEEE Vehicle power and propulsion conference, pp. 1-6 (Sep. 3-5, 2008).

Okba, H. M., et al., "Harmonics in HVDC Links, Part II Effects and Reduction Techniques," 38th annual conference on IEEE industrial electronics society, pp. 1328-1336 (2012).

Xiao, L. J., et al., "Harmonic cancellation for HVDC systems using a notch-filter controlled active DC filter," IEEE Proceedings, generation, transmission and distribution, institution of electrical engineers gb, vol. 147, No. 3, pp. 176-181 (May 2000).

Zhang, L., et al., "Interconnection of Two Very Weak AC Systems by VSC-HVDC Links Using Power-Synchronization Control," IEEE transactions on power systems, vol. 26, No. 1, pp. 344-355 (Feb. 2011).

Extended European Search Report and Opinion issued in connection with corresponding EP Application No. 13192363.3 dated Jul. 9, 2014.

Office Action issued in connection with corresponding EP Application No. 13192363.3 dated Jan. 27, 2016.

International Preliminary Report on Patentability issued in connection with corresponding PCT Application No. PCT/EP2014/074072 dated May 17, 2016.

Machine Translation and First Office Action and Search issued in connection with corresponding CN Application No. 201480072885.4 dated Dec. 5, 2017.

* cited by examiner

APPARATUS AND METHOD FOR CONTROL OF DIRECT CURRENT TRANSMISSION LINES

This application relates to methods and apparatus for the control of DC transmission lines, and in particular to control of voltage source converters, especially for damping of resonance.

HVDC (high-voltage direct current) electrical power transmission uses direct current (DC) for the transmission of electrical power. A first station may therefore transmit electrical energy to a second station over a DC transmission line. This is an alternative to alternating current electrical power transmission which is more common. There are a number of benefits to using HVDC electrical power transmission. The first station may generate the DC supply by conversion from a received alternating current (AC) input supply. The second station then typically provides conversion back from DC to AC.

The DC transmission lines, particularly those involving underground or subsea cables, have the typical characteristics of a lumped distributed system. Any disturbance on the line will travel along the line and may be reflected at the termination of line according to the properties of that termination. The reflected wave can combine with any continuing disturbance which can lead to resonance at a given frequency.

Such transmission lines can be described as a repeated sequence of 'pi' segments, in which there are two capacitances, each of a value equal to C/2, connected by an inductance of value L. The velocity of propagation along such a line, v, is given by v=1/√(LC) and each section has an equivalent impedance equal to √(L/C). If the transmission line is terminated with a resistance equal to √(L/C) then no reflection will occur, however if the termination has any other value of resistance then at least some energy will be reflected.

For an HVDC transmission line used to transmit electrical energy from one station to another it is conventional to use one station to regulate the DC voltage and the other station to regulate the power. FIG. 1 illustrates a simplified arrangement where a first voltage converter is coupled to a second voltage converter 102 via a transmission line represented by at least one pi segment 103. The first converter is arranged to regulate voltage and thus a controller 104 receives an indication of voltage demand and also receives measurement signals of the voltage of the DC transmission link and determines an appropriate control signal. The second voltage converter 102 is arranged to regulate the power and thus a controller 105 receives an indication of power demand and also a measurement of the DC voltage and DC current and determines appropriate control signals for the second converter.

Thus one station can be considered as a voltage source, and thus can be considered to have zero termination impedance, whilst the other station can be considered a current sink implying it has infinite termination impedance. This means that the station regulating the DC voltage becomes a node and the station regulating power becomes an anti-node. Thus resonance can occur in such a DC transmission system at frequencies such that the wavelength of the resonance correspond to factors of 4, 4/3, 4/5, 4/7, etc. of the cable length.

FIG. 2 shows voltage and current waveforms that were simulated using a simplified transmission line model along the lines as shown in FIG. 1. It can be seen that a voltage transient at the voltage control station can result in a resonance in the voltage at the power control station, and also in the current at the voltage control station. Likewise a step change in the demand at the power control station can lead to resonance.

The lowest frequency of such resonance will occur when the length of the transmission line corresponds to a quarter wavelength of the wave created along the transmission line. Using the standard wave equation, v=f.λ where λ is the wavelength, this corresponds to a frequency, f, of:

$$f = \frac{1}{\sqrt{LC}} \cdot \frac{1}{4 \cdot L_C} \qquad \text{Eqn. (1)}$$

where $L_c$ is the length of the transmission line.

For most cable HVDC transmission lines the lowest frequency of resonance will lie in the 50 Hz to 100 Hz region.

Historically HVDC has used current source converters known as line-commutated converters (LCCs) to convert from AC to DC and vice versa. LCCs use elements such as thyristors that can be turned on by appropriate trigger signals and remain conducting as long as they are forward biased. Typically such converters use a an arrangement of valves, such as in a six-pulse bridge or a twelve pulse bridge arrangement, to achieve the voltage conversion. In a twelve-pulse bridge arrangement with a 50 Hz AC input/output the control system for the LCC will have an equivalent sampling frequency of 600 Hz. The bandwidth of the control loop for such a converter will generally be about a decade below this value and thus in the region of about 40 to 50 Hz. The resonance of the transmission line as described above for such an LCC based HVDC system will therefore generally be outside the bandwidth of the LCC control and thus will not normally affect the control performance.

Recent developments in the power electronics field have however led to an increased use of voltages-source converters (VSC) for AC-DC and DC-AC conversion. VSCs use switching elements such as insulated-gate bipolar transistors (IGBTs) that can be controllably turned on and turned off. VSCs are thus sometime referred to as self-commutating converters. VSCs typically comprise a plurality of sub-modules that can be connected into an arm of the converter. In one form of known VSC, often referred to as a six pulse bridge, each valve connecting an AC terminal to a DC terminal comprises a set of series connected switching elements, typically IGBTs, each IGBT connected with an antiparallel diode. The IGBTs of the valve are switched together to connect or disconnect the relevant AC and DC terminals, with the valves of a given phase limb being switched substantially in antiphase. By using a pulse width modulated (PWM) type switching scheme for each arm, conversion between AC and DC voltage can be achieved. In another known type of VSC known as a Modular Multilevel Converter (MMC) each sub-module typically comprises a capacitor as an energy storage element and switching elements for selectively connecting or bypassing the capacitor. The capacitors of the various sub-modules may be connected in sequence to provide the voltage conversion.

For a VSC system the control bandwidth will be in the 100 Hz region and thus it is possible that the resonance of the transmission line will fall within the control bandwidth. This can potentially adversely impact on the control of the DC transmission and result in voltage fluctuations at the voltage converters. Such voltage fluctuation can result in power loss and in some cases could build to levels that could lead to damage or failure of components.

Conventionally to reduce such resonances the transmission cable may be terminated with a resistance representing its characteristic impedance. Thus, as illustrated in FIG. 3, for the station 301 providing voltage control, a series resistance 302 could be inserted and the station providing power control a shunt resistance 303 could be provided. To avoid a large power dissipation at steady state the series resistance 302 have a parallel inductance 304 and the shunt resistance may have a series capacitance 305. In each case the L/R and RC time constants may be set so that they give a knee point frequency that is nominally a decade or so below the cable resonance frequency. However, suitable resistances and capacitances require the use of large and expensive components which can increase the cost and size of the DC transmission stations.

Embodiments of the invention therefore provide control methods and apparatus that at least mitigate at least some of the above mentioned disadvantages.

Thus according to the present invention there is provided a control apparatus for controlling a voltage source converter for direct current transmission of electrical power over a transmission line, the control apparatus comprising:

regulation control for generating a regulation signal for controlling the voltage source converter to regulate an electrical parameter of the voltage source converter so as to regulate power transmission over the transmission line, said regulation signal being based on the difference between a measured value of said parameter and a reference value of said parameter, and damping control configured to generate a damping signal for modulating said regulation signal, said damping signal being generated as a function of a measured voltage or current of the transmission line and an impedance value for the transmission line.

The damping control may be configured such that the damping signal will apply no modulation to said regulation signal if the rate of change of the measured voltage or current is below a first limit.

In some embodiments the damping signal may be high-pass filtered prior to modulating said regulation signal. The high-pass filter may have a frequency cut-off in the range of 5 Hz to 20 Hz inclusive.

In some embodiments the regulation signal may be generated based on the difference between the measured value of the parameter and the reference value of the parameter as modified by the damping signal.

As mentioned the electrical parameter which is regulated is controlled so as to regulate power transmission over the transmission line. The electrical parameter of the voltage source converter may therefore be seen as an electrical parameter of the transmission line. In some instances the electrical parameter may be the DC link voltage, i.e. the voltage level of the transmission line. In which case the damping signal may be generated as a function of a measured current of the transmission line multiplied by said impedance value of the transmission line.

In some instances the electrical parameter which is regulated may be power and thus may be the power level of the transmission line. In which case the damping signal may be generated as a function of the square of the measured voltage of the transmission line divided by said impedance value of the transmission line.

Embodiments of the invention thus relate to a voltage source converter comprising a control apparatus as described above wherein the regulation signal is used to control operation of the voltage source converter.

Embodiments also relate to a high-voltage direct current transmission system comprising such a voltage source converter connected to a first transmission line, wherein the impedance value of the transmission line used by the control apparatus is based on a determined characteristic impedance for the first transmission line.

In another aspect of the invention there is provided a method of controlling a voltage source converter for direct current transmission of electrical power over a transmission line, the method comprising:

generating a regulation signal for controlling the voltage source converter to regulate an electrical parameter of the voltage source converter so as to regulate power transmission over the transmission line, said regulation signal being based on the difference between a measured value of said parameter and a reference value of said parameter, and generating a damping signal as a function of a measured voltage or current of the transmission line and a value of impedance of the transmission line; and using said damping signal to generate said regulation signal.

The method may be implemented in any of the variants described with reference to the first aspect of the invention.

In particular the damping signal may apply no modulation to the regulation signal if the rate of change of the measured voltage or current is below a first limit.

The damping signal may be high-pass filtered prior to modulating said regulation signal. The high-pass filter frequency cut-off may be in the range of 5 Hz to 20 Hz inclusive.

The regulation signal may be generated based on the difference between the measured value of the parameter and the reference value of the parameter as modified by the damping signal.

The electrical parameter may be the voltage of the DC link, i.e. the voltage level of the transmission line, in which case the damping signal may be generated as a function of a measured current of the transmission line multiplied by the impedance value of the transmission line.

The electrical parameter which is regulated may alternatively be power ad may for instance be the power level of the transmission line, in which case the damping signal may be generated as a function of the square of the measured voltage of the transmission line divided by the impedance value of the transmission line.

Aspects of the invention also relate to computer readable code stored on a non-transitory storage medium for performing the method described above or, which when run on a suitable computing device, provides a control apparatus as described above.

The invention will now be described by way of example only with reference to the following drawings, of which:

As described above, resonance of transmission lines in HVDC systems is undesirable and is especially a problem for systems using voltage source converters (VSCs) because the higher control bandwidths associated with VSCs, compared to LCC converters, means that the resonance may fall within the control bandwidth of the converter.

Embodiments of the present invention therefore provide control methods and apparatus for controlling voltage source converters used in DC transmission, and especially HVDC power transmission, wherein damping components are introduced into the regulation of the voltage converters to reduce resonance. The damping components are based on a relevant feedback variable for the type of regulation and adjusted by an impedance value of the transmission line.

Figure 4:
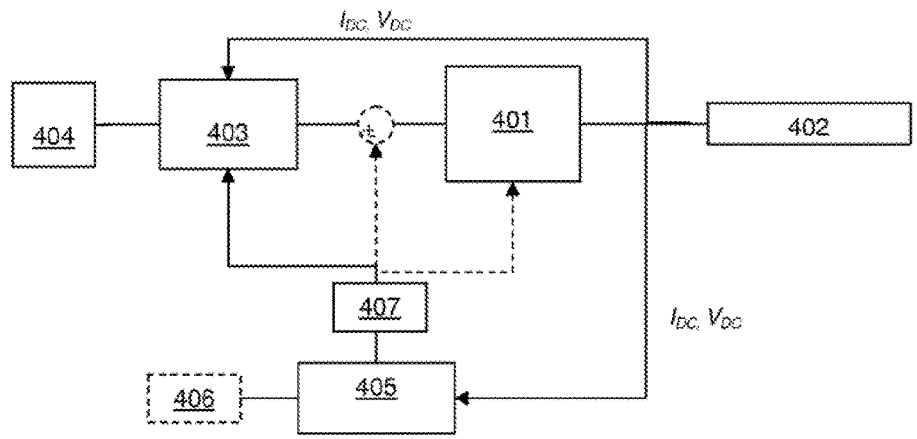
FIG. 4 illustrates a control apparatus according to an embodiment of the invention.

FIG. 4 shows an embodiment of a control apparatus for a voltage source converter according to an embodiment of the present invention. FIG. 4 shows a voltage source converter 401 which may for instance be a multilevel modular converter. Such converters are known and will not be further described. The converter in use will be connected for direct current transmission of electrical power over a transmission line 402 which, as described above can be seen as being represented by pi sections having a characteristic impedance equal to $\sqrt{L/C}$).

The converter 401 is controlled by a controller including regulation control 403. The regulation control forms parts of the controller for controlling the converter so as to regulate an electrical parameter of the converter, and hence the transmission line 402. As mentioned above typically one converter on one end of a HVDC transmission line is arranged to regulate the voltage of the transmission line and the converter at the other end of the transmission line is arranged to regulate the power.

The regulation control 403 thus receives a measurement value of the regulated parameter, e.g. voltage or power, and also a reference value of said parameter. The reference value may be received from a reference control block 404 and may be derived from demand signal indicating the voltage or power demand. Where the regulated parameter is power the power value may be generated by measured values of the transmission line current and transmission line voltage.

The regulation control produces a regulation signal which is based on the difference between the measured value of the parameter and the reference value. The regulation control is thus part of a servo control loop.

The VSC controller further includes damping control 405 for generating a damping signal to modulate the regulation signal. The damping control generates the damping signal as a function of a measured voltage or current of the transmission line and an impedance value of the transmission line. In essence the damping control generates a value related to the regulated parameter but based on the impedance of the transmission line and feedback variable which is not being regulated. Thus where voltage is regulated a measured current value is used to generate the damping signal and when power is regulated a measured voltage value is used to generate the damping signal as will be described in more detail below.

The characteristic value of impedance is based on the characteristics of the transmission line 402 to which the converter is connected. The impedance value may correspond exactly to a characteristic impedance of the transmission line which has been determined for that transmission line but in some instances an expected impedance value may be used. The impedance value may be stored in some sort of memory 406 or may be hardwired into the damping control, i.e. using suitable circuitry which is used in a converter with a known transmission line.

The damping control may be configured such that the damping signal will apply no modulation to said regulation signal if the rate of change of the measured voltage or current is below a first limit. This means that no modulation will be applied in steady state operation of the converter and steady state regulation will not be affected. However in response to any transients the damping signal can be used to modulate the regulation signal. The damping signal may therefore be high-pass filtered by a filter 407 prior to modulating said regulation signal. The high pass filter should have a cut-off frequency value which is nominally about a decade below the resonant frequency. For expected resonances in the range of about 50 Hz to 200 Hz therefore the frequency cut-off of the filter should be set within the range of about 5 Hz to 20 Hz inclusive. The knee point for the high pass filter should be set taking both the control bandwidth of the VSC servo and the resonance frequency of the transmission line into account. For a control bandwidth of the order of 100 Hz the high pass filter may be set with a cut-off frequency no greater than around 10 Hz.

The regulation signal may be modified at a number of different stages. For instance the regulation signal could be generated by the regulation control taking the damping signal into account. In others words the damping signal may be applied to the regulation control and the regulation signal generated based on the difference between the measured value of the parameter and the reference value of the parameter as modified by the damping signal. In this way the regulation signal is produced with the damping modulation applied. In other embodiments however the regulation signal could be produced based on the difference between the measured and reference values of the parameter and subsequently modulated by the damping signal. In some embodiments the damping signal could be supplied to the converter 401 and the modulation applied within the converter.

It will of course be appreciated that the regulation control 403 and damping control 405 form part of the overall apparatus of the converter and as mentioned form part of the control apparatus for the converter. Thus the element labelled 401 in FIG. 4 can be seen as indicating the rest of the apparatus of the converter.

It will therefore be appreciated that the damping control is thus part of the normal control of the voltage source converter. The regulation signal which generated by the regulation control is thus used to control operation of the VSC itself, i.e. as part of the control for controlling switching of the valves of the voltage source converters, i.e. the elements of the converter arms of the VSC.

As will be understood by one skilled in the art the regulation control may be implemented at least partly by hardware, e.g. suitable regulation circuitry and/or at least partly in software running on suitable processors. The damping control is also part of the VSC controller and can be seen as a part of the regulation control.

It will therefore be understood that the damping control is not some separate element such as an active filter. One skilled in the art will understand that active filters are known in some applications for filtering harmonics or the like. An active filter however is a separate element to the VSC and is typically connected to a suitable node of the circuit to provide filtering at that node, perhaps by generating opposing voltages. By contrast the damping control of embodiments of the invention is implemented as part of the control of the VSC itself. The damping control thus acts so as to influence the operation of the VSC itself, not merely to provide some downstream filtering.

Figure 5:
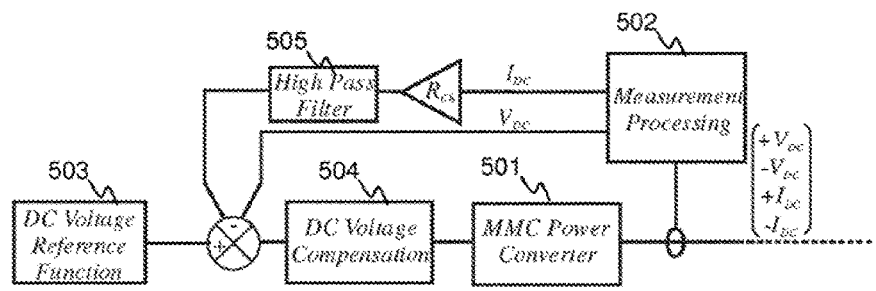
FIG. 5 illustrates an embodiment of the invention applied to voltage regulation.

As mentioned above the electrical parameter which is regulated may be the voltage level of the transmission line, i.e. the VSC may be operating in a voltage control mode and thus the regulated parameter is the DC voltage. For such a voltage regulation converter the damping signal may be generated as a function of a measured current of the transmission line multiplied by the impedance value of the transmission line. Thus for a voltage regulation converter the damping components are related to $I_{DC} \cdot R_{Ch}$ where $I_{DC}$ is the measured DC current and $R_{Ch}$ is the characteristic impedance value of the transmission line. FIG. 5 illustrates an embodiment of the invention applied to a VSC converter 501 with voltage regulation. A measurement block 502 measures the electrical properties of the converter and/or transmission line and produces a measured value of the voltage, $V_{DC}$. The difference between this measured voltage value and a reference value produced by a voltage reference function 503 is passed to a DC voltage compensation unit to adjust the operation of the power converter 501 accordingly. The damping signal is produced by multiplying the measured current value by a gain equal to $R_{Ch}$ and filtering the resulting signal with a high pass filter 505.

Figure 1:
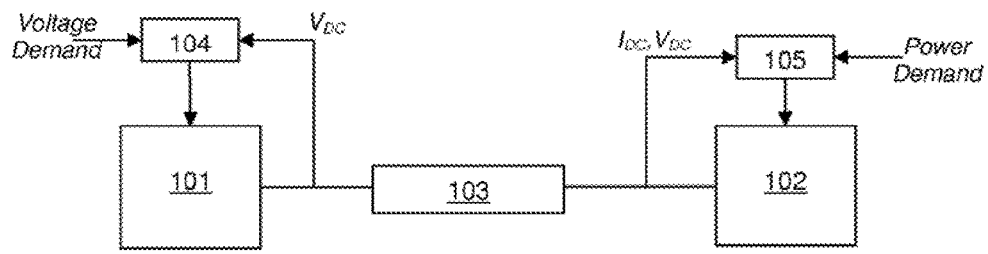
FIG. 1 illustrates the basic structure of an HVDC point to point transmission link.
Figure 2:
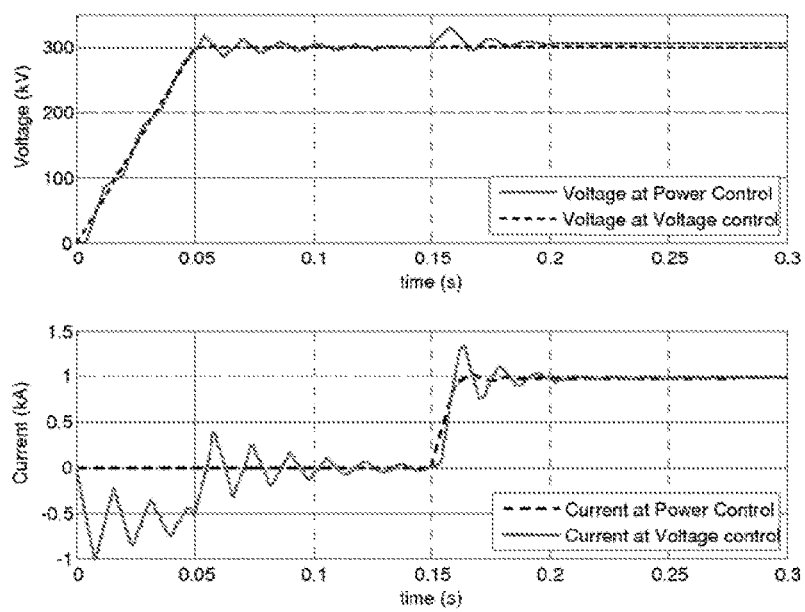
FIG. 2 illustrates some simulated results for disturbances on a modelled transmission line.
Figure 3:
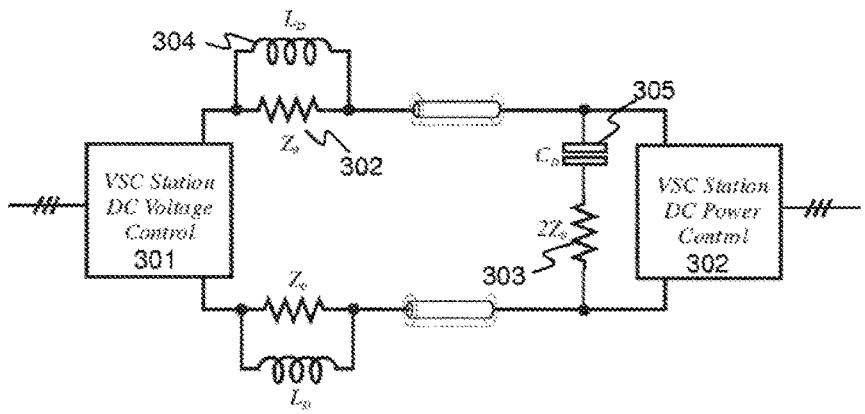
FIG. 3 illustrates a conventional approach to reducing resonance.
Figure 6:
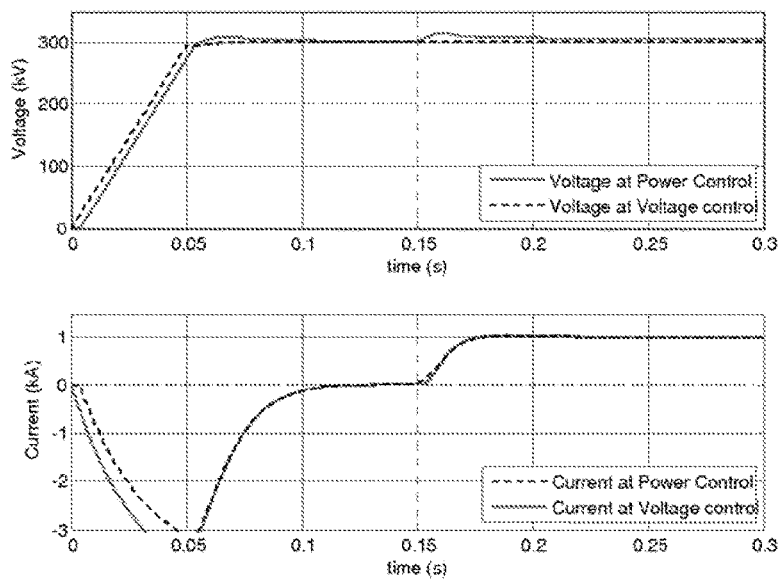
FIG. 6 illustrates some simulated results for disturbances on a modelled transmission line having a voltage regulation apparatus as shown in FIG. 5.

FIG. 6 shows voltage and current waveforms that were simulated using the same general simplified transmission line model as used for FIG. 2 but implementing the damping control illustrated in FIG. 5. The same general voltage and power demand changes as FIG. 2 were modelled. It can be seen that a change in voltage at the voltage control station results in a variation in voltage at the power control station which exhibits much less resonance and with a reduced maximum excursion. This initial large current variation would not occur in practice since it represents energisation of the HVDC line, when the control is not operating. The later change in the power demand also results in a much reduced variation in voltage at the power control station. It can be seen that this does result in a variation in the current at the power control station in response to the voltage transient at the voltage control station but the current response is largely resonance free.

In practice one possible disadvantage with this control function is that it does allow the voltage at the converter terminals to vary. This may need to be minimised due to the cable rating of the transmission line so some compromise may be required between the impedance value used and the high pass filter knee point.

Figure 7:
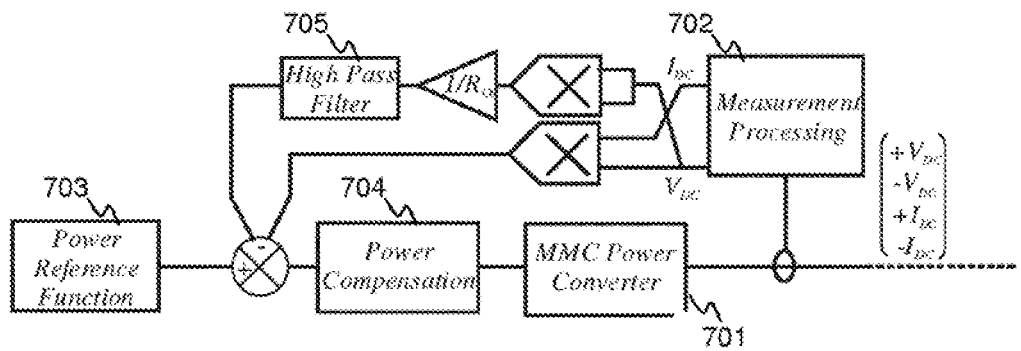
FIG. 7 illustrates an embodiment of the invention applied to power regulation.

The electrical parameter which is regulated may alternatively be the power level of the transmission line, e.g. the VSc may be operating in a power control mode. For a power regulation converter the damping signal may be generated as a function of the square of the measured voltage of the transmission line divided by the impedance value of the transmission line. Thus for a power regulation converter the damping components are related to $V_{DC}^2/R_{Ch}$ where $V_{DC}$ is the measured DC voltage and $R_{Ch}$ is the characteristic impedance value of the transmission line. FIG. 7 illustrates an embodiment of the invention applied to a VSC converter 701 with power regulation. A measurement block 702 measures the electrical properties of the converter and/or transmission line and produces measured values of the voltage, $V_{DC}$ and current, $I_{DC}$ which are multiplied to generate a power value. The difference between this measured power value and a reference value produced by a power reference function 703 is passed to a DC power compensation unit to adjust the operation of the power converter 701 accordingly. The damping signal in this example is produced by multiplying the measured voltage value by itself and then multiplying by a gain equal to $1/R_{Ch}$ and filtering the resulting signal with a high pass filter 705.

Figure 8:
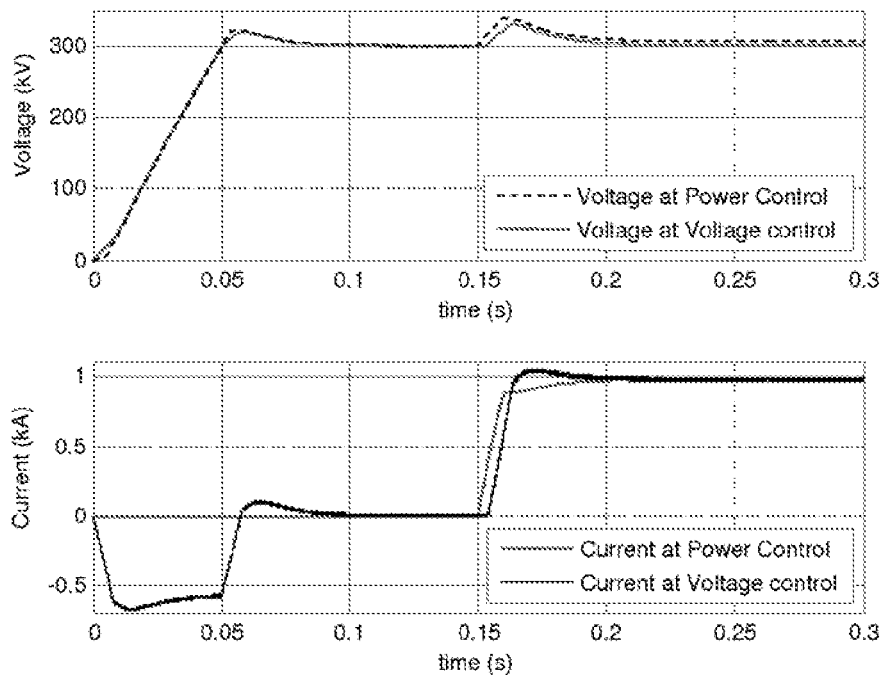
FIG. 8 illustrates some simulated results for disturbances on a modelled transmission line having a power regulation apparatus as shown in FIG. 5.

FIG. 8 shows voltage and current waveforms that were simulated using the same general simplified transmission line model as used for FIG. 2 but implementing the damping control illustrated in FIG. 7. The same general voltage and power demand changes as FIG. 2 were modelled. Again it can be seen that resonance is much reduced.

It will be appreciated that in any of the embodiments described above at least part of the damping control and/or regulation could be implemented by suitable circuit components, e.g. amplifiers, multipliers, adders etc. which may be analogue or digital or mixed signal and/or at least part of the damping or regulation function could be implemented by suitably programmed processing circuitry.

In general therefore embodiments of the invention relate to methods and apparatus for controlling operation of a voltage source converter. A regulation signal may be generated and used to control operation of the voltage source converter to regulate a parameter of the converter/transmission line, such as the power or voltage. Damping control modulates the regulation signal based on the relevant feedback variable adjusted by a value of characteristic impedance of the transmission line in order to reduce resonance. Embodiments also relate to a high-voltage direct current transmission system comprising such a voltage source converter connected to a first transmission line, wherein said characteristic impedance of the transmission line is based on a determined impedance for said first transmission line.

It should be noted that the above-mentioned embodiments illustrate rather than limit the invention, and that those skilled in the art will be able to design many alternative embodiments without departing from the scope of the appended claims. The word "comprising" does not exclude the presence of elements or steps other than those listed in a claim, "a" or "an" does not exclude a plurality, and a single feature or other unit may fulfil the functions of several units recited in the claims. Any reference signs in the claims shall not be construed so as to limit their scope.

The invention claimed is:

1. A control apparatus for controlling a voltage source converter for direct current (DC) transmission of electrical power over a transmission line, the control apparatus comprising:

a regulation control for generating a regulation signal to regulate a DC voltage of the transmission line, said regulation signal being based on a difference between a measured value of DC voltage of the transmission line and a reference value of DC voltage of the transmission line; and a damping control configured to generate a damping signal for modulating said regulation signal, wherein said damping signal is generated as a function of a measured value of DC current of the transmission line multiplied by an impedance value for the transmission line, wherein the damping signal reduces the regulation signal.

2. The control apparatus of claim 1, wherein said damping control is configured such that the damping signal will apply modulation to said regulation signal if a rate of change of the measured value of DC current is above a first limit.

3. The control apparatus of claim 1, wherein a high-pass filter is applied to said damping signal prior to modulating said regulation signal.

4. The control apparatus of claim 3, wherein said high-pass filter has a frequency cut-off in a range of 5 Hz to 20 Hz.

5. The control apparatus of claim 1, wherein said regulation signal is generated based on the difference between the measured value of DC voltage and the reference value of DC voltage as modified by the damping signal.

6. The control apparatus of claim 1, wherein the voltage source converter is operating in a voltage control mode.

7. The control apparatus of claim 1, further comprising a measurement processing device configured to measure the measured value of DC voltage and the measured value of DC current.

8. The control apparatus of claim 1, wherein the reference value of DC voltage of the transmission line is derived from a demand signal indicating a voltage demand.

9. The control apparatus of claim 3, wherein the high-pass filter has a cut-off frequency no greater than 10 Hz.

10. A control apparatus for controlling a voltage source converter for direct current (DC) transmission of electrical power over a transmission line, the control apparatus comprising:
    a regulation control for generating a regulation signal to regulate a power level of the transmission line, said regulation signal being based on a difference between a measured value of power of the transmission line and a reference value of power of the transmission line, wherein the measured value of power is generated as a function of a measured value of DC current of the transmission line multiplied by a measured value of DC voltage of the transmission line; and
    a damping control configured to generate a damping signal for modulating said regulation signal, wherein said damping signal is generated as a function of the square of the measured DC voltage of the transmission line divided by an impedance value of the transmission line.

11. The control apparatus of claim 10, wherein said damping control is configured such that the damping signal will apply modulation to said regulation signal if a rate of change of the measured value of DC voltage is above a first limit.

12. The control apparatus of claim 10, wherein a high-pass filter is applied to said damping signal prior to modulating said regulation signal.

13. The control apparatus of claim 12, wherein said high-pass filter has a frequency cut-off in a range of 5 Hz to 20 Hz.

14. The control apparatus of claim 12, wherein the high-pass filter has a cut-off frequency no greater than 10 Hz.

15. The control apparatus of claim 10, wherein said regulation signal is generated based on the difference between the measured value of power and the reference value of power as modified by the damping signal.

16. The control apparatus of claim 10, wherein the voltage source converter is operating in a power control mode.

17. The control apparatus of claim 10, further comprising a measurement processing device configured to measure the measured value of DC voltage and the measured value of DC current.

18. The control apparatus of claim 10, wherein the reference value of power of the transmission line is derived from a demand signal indicating a power demand.

19. The control apparatus of claim 10, wherein the voltage source converter is connected for direct current transmission of electrical power over a transmission line.

\* \* \* \* \*